United States Patent
Hrabak

(10) Patent No.: US 9,368,119 B2
(45) Date of Patent: Jun. 14, 2016

(54) METHODS AND APPARATUS TO CONVERT RECEIVED GRAPHICAL AND/OR TEXTUAL USER COMMANDS INTO VOICE COMMANDS FOR APPLICATION CONTROL

(71) Applicant: GM GLOBAL TECHNOLOGY OPERATIONS LLC, Detroit, MI (US)

(72) Inventor: Robert A. Hrabak, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 133 days.

(21) Appl. No.: 14/225,238

(22) Filed: Mar. 25, 2014

(65) Prior Publication Data
US 2015/0279367 A1    Oct. 1, 2015

(51) Int. Cl.
G10L 21/00 (2013.01)
G10L 17/22 (2013.01)
G10L 15/30 (2013.01)
G10L 21/10 (2013.01)
G10L 13/00 (2006.01)

(52) U.S. Cl.
CPC .............. *G10L 17/22* (2013.01); *G10L 15/30* (2013.01); *G10L 21/10* (2013.01); *G10L 13/00* (2013.01)

(58) Field of Classification Search
CPC ....................................... G10L 15/28
See application file for complete search history.

(56) References Cited

U.S. PATENT DOCUMENTS

| | | | | |
|---|---|---|---|---|
| 5,890,122 A * | 3/1999 | Van Kleeck | ............ | G10L 15/26 704/235 |
| 6,240,347 B1 * | 5/2001 | Everhart | ................ | B60K 35/00 367/197 |
| 6,499,015 B2 * | 12/2002 | Brooks | ..................... | G06F 3/16 704/231 |
| 7,027,975 B1 * | 4/2006 | Pazandak | ................ | G10L 15/30 704/9 |
| 7,099,829 B2 * | 8/2006 | Gomez | ................... | G10L 15/22 704/270 |
| 7,443,962 B2 * | 10/2008 | Basu | ..................... | H04M 1/642 379/88.04 |
| 8,977,255 B2 * | 3/2015 | Freeman | ........... | H04M 1/72522 455/425 |
| 9,162,574 B2 * | 10/2015 | Kolodziej | ............. | H04W 4/046 |
| 2003/0138113 A1 * | 7/2003 | Han | ........................ | G10L 13/00 381/77 |
| 2006/0206335 A1 * | 9/2006 | Thelen | .................. | H04H 20/31 704/275 |
| 2007/0033055 A1 * | 2/2007 | Tanaka | .................... | G10L 15/22 704/275 |
| 2008/0154602 A1 * | 6/2008 | Hollander | ................ | G01D 7/12 704/251 |
| 2009/0204410 A1 * | 8/2009 | Mozer | ..................... | G10L 15/30 704/275 |
| 2009/0298474 A1 * | 12/2009 | George | ................... | G10L 13/00 455/412.2 |

(Continued)

*Primary Examiner* — Brian Albertalli
(74) *Attorney, Agent, or Firm* — Ingrassia Fisher & Lorenz, P.C.

(57) ABSTRACT

A method for transmitting communications from a vehicle onboard computer system is provided. The method receives a graphical user command via a user interface; converts the user command into a voice instruction; and transmits the voice instruction to an electronic device, using machine-to-machine (M2M) communication.

19 Claims, 2 Drawing Sheets

(56) References Cited

U.S. PATENT DOCUMENTS

| | | | |
|---|---|---|---|
| 2012/0052909 A1* | 3/2012 | Joh | G08C 17/02 455/557 |
| 2012/0245945 A1* | 9/2012 | Miyauchi | G10L 15/06 704/275 |
| 2012/0278490 A1* | 11/2012 | Sennett | H04W 4/005 709/227 |
| 2013/0096921 A1* | 4/2013 | Kuwamoto | G08G 1/0962 704/260 |
| 2013/0322608 A1* | 12/2013 | Jesse | H04M 3/493 379/88.01 |
| 2014/0152816 A1* | 6/2014 | Pratt | G10L 15/26 348/143 |
| 2014/0297806 A1* | 10/2014 | Hwang | H04W 4/005 709/219 |
| 2015/0039307 A1* | 2/2015 | Jeon | G10L 15/26 704/235 |
| 2015/0154492 A1* | 6/2015 | Ponomarev | G06N 3/004 706/11 |

* cited by examiner

METHODS AND APPARATUS TO CONVERT RECEIVED GRAPHICAL AND/OR TEXTUAL USER COMMANDS INTO VOICE COMMANDS FOR APPLICATION CONTROL

TECHNICAL FIELD

Embodiments of the subject matter described herein relate generally to the transmission of communications from a computer system to an electronic device. More particularly, embodiments of the subject matter relate to the conversion of input into voice commands for transmission from a computer system to an electronic device.

BACKGROUND

A vehicle onboard computer system has the capability of interacting with an external electronic device, such as a smartphone, to provide extended functionality inside the vehicle. More specifically, an electronic device may provide an onboard computer system with the ability to execute and operate downloadable software applications (i.e., "apps") resident on the electronic device. Current in-vehicle controls do not provide a way to interact with apps installed on an electronic device. However, an onboard computer system includes a natural language engine that can add keywords, such as app names, and turn generic haptic controls into voice commands. In addition, increasing numbers of electronic devices support app control through voice recognition (VR).

Accordingly, it is desirable to provide a method for communication between a vehicle onboard computer system and an external electronic device. Furthermore, other desirable features and characteristics will become apparent from the subsequent detailed description and the appended claims, taken in conjunction with the accompanying drawings and the foregoing technical field and background.

BRIEF SUMMARY

Some embodiments provide a method for transmitting communications from a vehicle onboard computer system. The method receives a graphical user command via a user interface; converts the user command into a voice instruction; and transmits the voice instruction to an electronic device, using machine-to-machine (M2M) communication.

Some embodiments provide a system onboard a vehicle for performing machine to machine communication. The system includes an electronic device, configured to activate and operate a plurality of applications, wherein the applications reside on the electronic device; and an onboard computer system, communicatively coupled to the electronic device, the onboard computer system comprising: a user interface, configured to receive a user input instruction associated with the electronic device; a command conversion module, configured to convert the received user input into a speech command; and a communication module, configured to transmit the speech command.

Some embodiments provide a non-transitory, computer-readable medium containing instructions thereon, which, when executed by a processor, perform a method. The method translates a graphical user instruction into a form compatible with voice recognition (VR) technology, to obtain a VR instruction; and transmits the VR instruction, via machine-to-machine (M2M) communication, to an VR-enabled electronic device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to methods used by a vehicle onboard computer system to perform machine-to-machine (M2M) communication with a communicatively coupled electronic device. The onboard computer system is configured to convert received user input into commands compatible with voice recognition (VR) technology, transmit VR commands to VR-enabled or VR-compatible electronic devices, and to activate and operate downloadable software applications (i.e., "apps") at a compatible electronic device using such VR commands. Functionality associated with activated apps may be presented via the onboard computer system.

For purposes of explanation, voice or speech recognition may be defined as the ability of a processor or program to receive, understand, and carry out spoken commands. As used herein, the terms "voice recognition" and "speech recognition" may be used interchangeably, and represent any VR-compatible technology. Additionally, the terms "voice command", "voice instruction", "speech command", "speech instruction", and "VR command" are used interchangeably herein.

Figure 1:
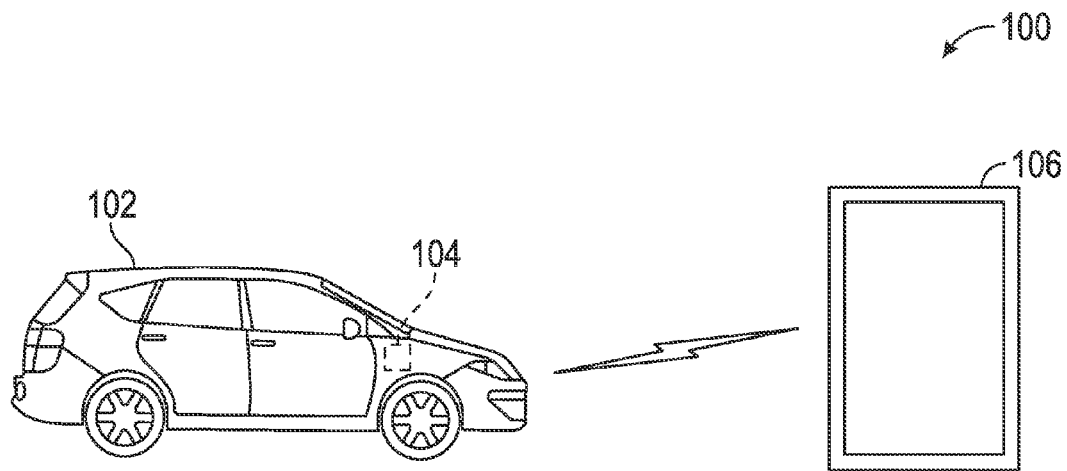
FIG. 1 is a diagram of a system for transmitting communications between a vehicle onboard computer system and an electronic device, in accordance with the disclosed embodiments.

Referring now to the drawings, FIG. 1 is a diagram of a system 100 for transmitting communications between a vehicle onboard computer system 104 and an electronic device 106, in accordance with the disclosed embodiments. As shown, a vehicle 102 has an onboard computer system 104 which communicates with an electronic device 106. The vehicle 102 may be any one of a number of different types of types of automobiles (sedans, wagons, trucks, motorcycles, sport-utility vehicles, vans, etc.), aviation vehicles (such as airplanes, helicopters, etc.), watercraft (boats, ships, jet skis, etc.), trains, all-terrain vehicles (snowmobiles, four-wheelers, etc.), military vehicles (Humvees, tanks, trucks, etc.), rescue vehicles (fire engines, ladder trucks, police cars, emergency medical services trucks and ambulances, etc.), spacecraft, hovercraft, and the like.

The onboard computer system 104 may be implemented using any number (including only one) of electronic control modules onboard the vehicle 102. The onboard computer system 104 includes various informational and/or entertainment (i.e., "infotainment") system components that are not illustrated in FIG. 1 for sake of clarity, such as one or more ports (e.g., USB ports), one or more Bluetooth interface(s), input/output devices, one or more display(s), one or more audio system(s), one or more radio systems, and a navigation system. In one embodiment, the input/output devices, display(s), and audio system(s) collectively provide a human machine interface (HMI) inside the vehicle.

The onboard computer system 104 is configured to communicate with an electronic device 106. The electronic device 106 can be communicatively coupled over any type of communication link including, but not limited to a wired communication link such as a USB connection, or a wireless communication link such as a Bluetooth communication link or WLAN communication link, or the like. The electronic device 106 can be a consumer electronics device (such as a portable wireless communication device or smartphone) that is located in, or in communication range of, the onboard computer system 104. The electronic device 106 is typically implemented as a personal computing device, such as, without limitation: a smartphone, a tablet computer, a laptop computer, a smart-watch, or the like.

During typical operation, the electronic device 106 may connect to, and provide extended functionality for, the onboard computer system 104 through the use of downloadable software applications (also called "apps") resident on the electronic device 106. In certain embodiments, the onboard computer system 104 receives graphical elements (including images, menus, user-selectable options, and the like) and associated data (including functionality resulting from user input) from the electronic device 106. Further, the onboard computer system 104 may present received graphical elements and data to a user via a display. In some embodiments, the onboard computer system 104 receives recognizable commands, associated with a particular app, from the electronic device 106. In this scenario, the onboard computer system 104 creates and presents a menu system for the received commands, instead of receiving graphical elements from the electronic device 106.

In certain embodiments, the electronic device 106 may also provide internet access to the onboard computer system 104, via wireless communication links commonly associated with mobile computing devices. The physical layer used to implement these wireless communication links can be implemented using any known or later-developed wireless communication or radio technology. In some embodiments, the wireless communication links can be implemented, for example, using one or more of Dedicated Short-Range Communications (DSRC) technologies, cellular radio technology, satellite-based technology, wireless local area networking (WLAN) or WI-FI® technologies such as those specified in the IEEE 802.x standards (e.g. IEEE 802.11 or IEEE 802.16), WIMAX®, BLUETOOTH®, near field communications (NFC), the like, or improvements thereof.

Figure 2:
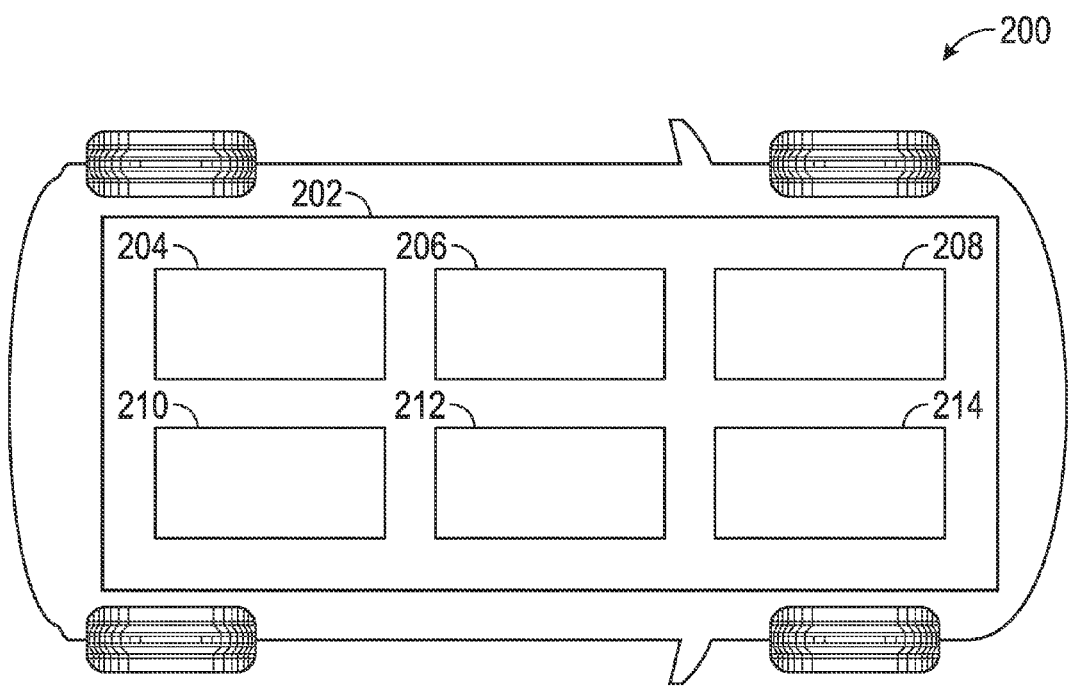
FIG. 2 is a functional block diagram of a vehicle that includes an onboard computer system, in accordance with an embodiment.

FIG. 2 is a functional block diagram of a vehicle 200 that includes an onboard computer system 202, in accordance with an embodiment. It should be noted that the onboard computer system 202 can be implemented with the onboard computer system 104 depicted in FIG. 1. In this regard, the onboard computer system 202 shows certain elements and components of the onboard computer system 104 in more detail. As depicted, the onboard computer system 202 includes, without limitation: a processor architecture 204, a system memory 206, a user interface 208, a communication module 210, an application counterpart module 212, and a command conversion module 214. These elements and features of the onboard computer system 202 may be operatively associated with one another, coupled to one another, or otherwise configured to cooperate with one another as needed to support the desired functionality—in particular, converting user instructions into voice commands for transmission to a voice recognition (VR) compatible (i.e., VR-enabled) electronic device, as described herein. For ease of illustration and clarity, the various physical, electrical, and logical couplings and interconnections for these elements and features are not depicted in FIG. 2. Moreover, it should be appreciated that embodiments of the onboard computer system 202 will include other elements, modules, and features that cooperate to support the desired functionality. For simplicity, FIG. 2 only depicts certain elements that relate to the techniques described in more detail below.

The processor architecture 204 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor architecture 204 may be realized as one or more microprocessors, controllers, microcontrollers, or state machines. Moreover, the processor architecture 204 may be implemented as a combination of computing devices, e.g., a combination of digital signal processors and microprocessors, a plurality of microprocessors, one or more microprocessors in conjunction with a digital signal processor core, or any other such configuration.

The system memory 206 may be realized using any number of devices, components, or modules, as appropriate to the embodiment. Moreover, the onboard computer system 202 could include system memory 206 integrated therein and/or system memory 206 operatively coupled thereto, as appropriate to the particular embodiment. In practice, the system memory 206 could be realized as RAM memory, flash memory, EPROM memory, EEPROM memory, registers, a hard disk, a removable disk, or any other form of storage medium known in the art. In certain embodiments, the system memory 206 includes a hard disk, which may also be used to support functions of the onboard computer system 202. The system memory 206 can be coupled to the processor architecture 204 such that the processor architecture 204 can read information from, and write information to, the system memory 206. In the alternative, the system memory 206 may be integral to the processor architecture 204. As an example, the processor architecture 204 and the system memory 206 may reside in a suitably designed application-specific integrated circuit (ASIC).

The user interface 208 may include or cooperate with various features to allow a user to interact with the onboard computer system 202. Accordingly, the user interface 208 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the onboard computer system 202. For example, the user interface 208 could be manipulated by an operator to select an image capture software application, and configure operational parameters for a plurality of onboard cameras via the image capture software application, as described above.

The communication module 210 is suitably configured to communicate data between the onboard computer system 202 and an external electronic device (see, for example, FIG. 1). As described in more detail below, data received by the communication module 210 may include, without limitation: a listing of applicable app commands for an electronic device, graphical elements associated with applicable app commands, and/or data associated with a particular app, including various menus and functionality, communicated from an electronic device for presentation via the user interface 208 of the onboard computer system 202. Data provided by the communication module may include, without limitation: user input instructions, including app execution commands and app operation commands (e.g., menu selections, etc.).

The application counterpart module 212 is suitably configured to produce a graphical interface, via the onboard computer system 202, based on received data from an electronic device. The produced graphical interface provides a structure for a user to interact with one or more apps on an electronic device. For example, a user may manipulate the produced graphical interface, at the onboard computer system 202, to open, operate, execute commands for, or otherwise communicate with, one or more apps on the electronic device. During typical operation, the onboard computer system 202 acts as an intermediary between a user and an electronic device by receiving user input and transmitting it to the electronic device, and receiving data from the electronic device and presenting it to the user. The application counterpart module 212 creates an interface to receive graphical user commands via the user interface 208, transmits the user commands to the electronic device, and controls apps on the electronic device using the transmitted user commands. The application counterpart module 212 creates the graphical user interface using data received from the electronic device, which may include graphical elements and/or a listing of applicable commands for use in a constructed menu. In some embodiments, the created interface may include graphical elements that are similar or identical to those graphical elements of a corresponding app being accessed on the electronic device, via the onboard computer system 202. In some embodiments, the created interface may include graphical elements that differ from those graphical elements of a corresponding app being accessed on the electronic device.

The command conversion module 214 is configured to convert received user input instructions into voice commands. The received user commands are graphical or textual commands, created via selections on a graphical user interface, which may include menus and submenus of user-selectable options. Such graphical/textual commands are translated into speech or voice instructions, or in other words, converted into commands that are compatible with voice recognition (VR) technology. The command conversion module 214 may utilize any of the commonly known and used speech synthesis techniques in the art, to include text-to-speech conversion, glyph-to-phoneme conversion, or the like.

Figure 3:
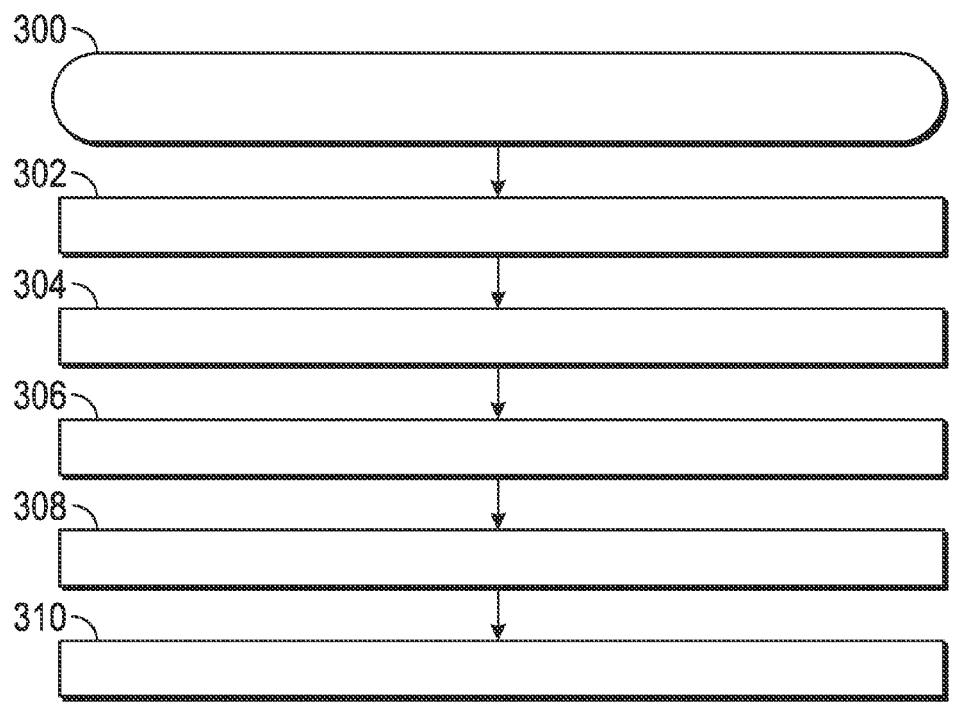
FIG. 3 is a flowchart that illustrates an embodiment of a process for transmitting communications from a vehicle onboard computer system.

FIG. 3 is a flowchart that illustrates an embodiment of a process 300 for transmitting communications from a vehicle onboard computer system. The various tasks performed in connection with process 300 may be performed by software, hardware, firmware, or any combination thereof. For illustrative purposes, the following description of process 300 may refer to elements mentioned above in connection with FIGS. 1-2. In practice, portions of process 300 may be performed by different elements of the described system. It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

For ease of description and clarity, this example assumes that the process 300 begins by receiving a graphical user command via a user interface (step 302). As described with regard to the application counterpart module of the onboard computer system, the process 300 receives user instructions entered at a user interface using graphical elements provided by the electronic device and/or a menu constructed by the onboard computer system. In certain embodiments, the user command includes an instruction to activate (i.e., execute) a software application on an electronic device, and in some embodiments, the user command includes a second instruction to perform an operation using the activated software application. A user command may also include other instructions relating to functionality of a particular app, such as menu selections, user-selectable options, and the like. One suitable methodology for receiving a user command via user interface is described below with reference to FIG. 4.

Next, the process 300 converts the graphical/textual user command into a voice instruction (step 304). The process utilizes conversion techniques known in the art, and after the conversion is performed, a voice instruction, in the form of human speech, has been created. Generally, the process 300 utilizes speech synthesis techniques that are well-known in the art, such as text-to-speech conversion, glyph-to-phoneme conversion, text-to-phoneme conversion, grapheme-to-phoneme conversion, or the like.

After converting the graphical user command into a voice instruction (step 304), the process 300 transmits the voice instruction to an electronic device (step 306), using machine-to-machine (M2M) communication. Here, the voice instruction is essentially created by, and transmitted from, a computer system to an electronic device, for interpretation and execution by the electronic device. The transmission may be performed via wired or wireless communication link to an electronic device having voice recognition (VR) capabilities. In some embodiments, the process 300 may first activate a voice recognition (VR) capability, also called a speech-recognition capability, of the electronic device, prior to transmitting the voice instruction. An appropriate electronic device has the ability to receive and interpret voice commands, including the ability to execute and operate downloadable software applications (i.e., "apps").

The process 300 then receives data in response to the voice instruction (step 308). Once a voice command to activate an app is transmitted, the voice command is received, interpreted, and executed. The app opens and transmits data associated with the open app, to include graphical elements for the open app, to an onboard computer system for display. In some embodiments, such graphical elements may match the graphical elements visible on the electronic device and associated with the app. However, in some embodiments, the graphical elements may differ from graphical elements visible on the electronic device due to the open app, while still being associated with the app. Further, the app is opened up to perform one or more particular functions. Once the app has been executed, additional instructions may be received, converted, and transmitted to the electronic device, where these additional instructions are executed. The app performs the commanded operations and transmits the resulting data to the onboard computer system for presentation to the user. The data resulting from the commanded operations depends on the particular app manipulated. For example, when the process 300 executes and interacts with a social media app, the resulting data may include a newsfeed and/or listing of real-time updates from a user contact list, trending topics, private or public messaging, search results, and any other capability associated with the particular social media app.

After receiving data in response to the voice instruction (step 308), the process 300 performs an operation based on the received data (step 310). Here, the process 300 receives information requested by the user and presents the data via the onboard computer system. For example, with regard to a navigation app, the process 300 receives and presents a visual representation of a map, turn-by-turn directions, or receives and presents other functionality of the navigation app via the onboard computer system. In another example, with regard to an internet radio app, the process 300 receives and plays music via the onboard computer system, according to the previously entered user input.

Essentially, the process 300 receives user input intended for use at an electronic device, translates the user input into a speech command compatible with the electronic device, transmits the compatible speech command to the electronic device, and receives and presents output from the electronic device, based on the transmitted speech command. For example, when using an internet-based radio app, the process 300 could receive the execute instruction, convert the execute instruction into a voice command to execute the radio app, and transmit the voice command to the electronic device, where the voice command is interpreted and the radio app is then executed, based on the interpreted voice command. Graphical elements associated with the executed radio app are then received and displayed by the onboard computer system, for presentation to the user. Additional instructions, corresponding to various operational commands for the radio app, may then be received by the process 300, via the graphical elements associated with the executed radio app, which are presented by the onboard computer system display. These received additional instructions are then converted into voice commands, and transmitted to the electronic device. The electronic device receives, interprets, and executes the voice commands. In this example, the additional voice commands are associated with additional functionality of internet radio station apps, which may include selections of particular radio stations, artists, songs, and the like. Additionally, the electronic device transmits data resulting from the executed speech command to the onboard computer system. This data may include music data, when the executed speech command is to activate and operate an internet radio station app. In other embodiments, the data resulting from the executed speech command may include other types of data, including navigation data, social media data, and any other data resulting from the activation and operation of an app resident on the electronic device.

In another example, a navigation app is opened when the process 300 receives a command at a user interface of an onboard computer system. For purposes of this example, the navigation app resides at an electronic device that is communicatively coupled to the onboard computer system. The received command is to open, or in other words, to activate the navigation app. The process 300 converts the received execute command into a voice command and transmits the voice command to the electronic device for interpretation and execution. Once the navigation app is activated, graphical elements associated with the navigation app are then received and displayed by the onboard computer system, for presentation to the user. The process 300 may then receive additional instructions corresponding to various operational commands for the navigation app. Received additional instructions are converted into voice commands and then transmitted to the electronic device. The electronic device receives, interprets, and executes the voice commands, which may include standard operations associated with navigation apps, such as turn-by-turn directions, mapping, etc.

Although the previous examples illustrate implementations of the present invention using a vehicle onboard computer system in communication with an electronic device, it should be appreciated that any computer system in communication with an electronic device may be used. Such computer systems may include personal computers (PCs), mobile computing devices (e.g., tablet computers, smartphones, personal digital assistants, etc.), "smart" television sets, "wearables" (e.g., Bluetooth headsets, smart-watches, etc.), or the like.

Figure 4:
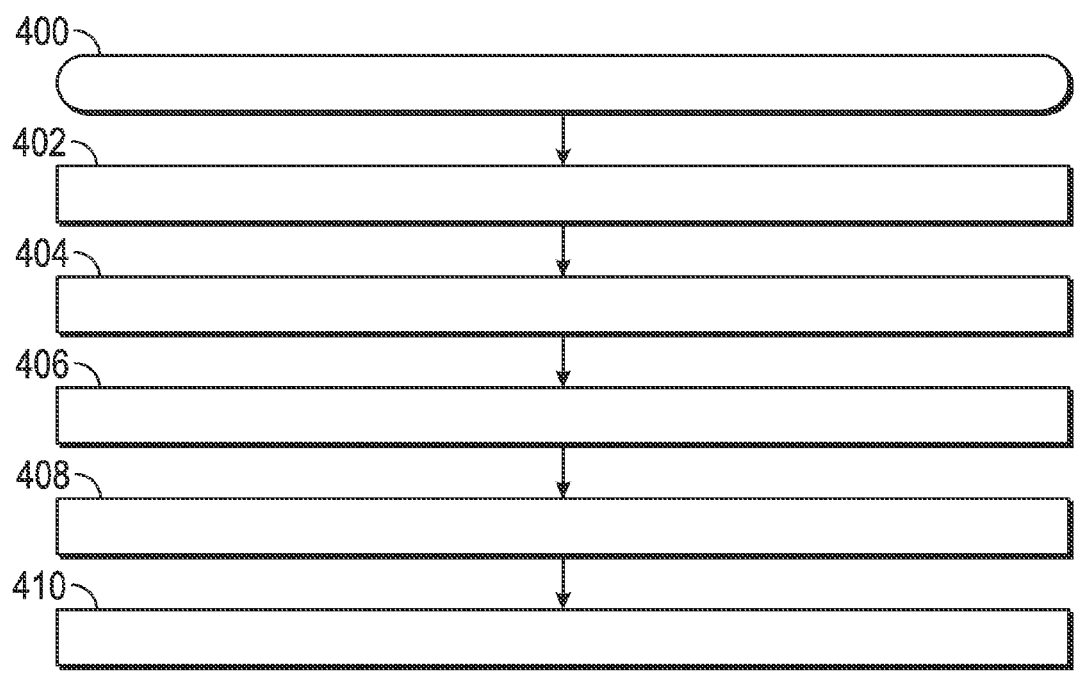
FIG. 4 is a flowchart that illustrates an embodiment of a process for receiving a graphical user command at a user interface.

FIG. 4 is a flowchart that illustrates an embodiment of a process 400 for receiving a user command at a user interface. It should be appreciated that the process 400 described in FIG. 4 represents one embodiment of step 302 described above in the discussion of FIG. 3, including additional detail. First, the process 400 establishes a connection to an electronic device (step 402). Generally, a user connects the electronic device to a vehicle onboard computer system, and the connection may include a wired or wireless communication link.

After connecting to the electronic device (step 402), the process 400 obtains a plurality of graphical elements from the electronic device (step 404), using the established connection, and the process 400 then displays the plurality of graphical elements at a user interface (step 406) of the onboard computer system. The displayed graphical elements may include one or more graphical user interfaces, further including images, icons, hyperlinks, menus, user-selectable options, and other displayed features from which a user may interact with an app resident on the electronic device. In certain embodiments, however, the process 400 receives a list of commands from the electronic device, and constructs a menu for presentation to the user. The menu or the graphical elements may reflect some of the same visual attributes displayed on the screen of the electronic device, or the menu or graphical elements may include differing visual attributes.

Next, the process 400 receives a plurality of selections via the plurality of graphical elements (step 408), and creates a user command based on the plurality of selections (step 410). The plurality of selections may be received from a user interacting with the received graphical elements, or the constructed menu based on a received listing of applicable commands. Once received, the process 400 translates, or converts, the plurality of selections into a voice command for transmission to the electronic device. For example, when the process 400 connects to an electronic device to open and interact with an internet radio app, the process 400 may first receive graphical elements that include available apps for selection and activation. The process 400 then receives a selection from the user, indicating a particular internet radio app for execution. After opening the selected internet radio app, the process 400 may receive graphical elements that include menus of user-selectable radio stations, music genres, artists, songs, and the like. The process 400 then receives one or more additional selections from the user, which may include, for example, a first selection of a classical music genre and then a second selection of a particular classical music station. In this case, the process 400 creates a user instruction for the internet radio app to open, select a classical music genre, and select a particular classical music station for playing music. The user command is built using the three received selections, and the process 400 reverts back to the method illustrated in FIG. 3, to convert the built user command into a voice command for transmission.

In another example, when the process 400 connects to an electronic device to open and interact with a navigation app, the process 400 may first receive a list of applicable commands that include available apps for selection and activation. The process 400 constructs a menu using the received data, and presents the menu (including the applicable selections/execute commands) to the user. The process 400 then receives a selection from the user, via the constructed menu, indicating a particular navigation app for execution. After opening the selected navigation app, the process 400 may receive another list of commands applicable to the navigation app, and construct another menu to include these choices. Such choices may include user-selectable options for turn-by-turn directions, routing details, viewing a large map, traffic information, and the like. The process 400 then receives one or more additional selections from the user, which may include, for example, a first selection of a first route for mapping and then a second selection of traffic information along the previously selected route. In this case, the process 400 creates a user instruction for the navigation app to open, select a particular route for mapping, and select traffic information for the particular route. Here again, the user command is created using the three received selections, and the process 400 reverts back to the method illustrated in FIG. 3, to convert the created user command into a voice command for transmission to the electronic device.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for transmitting communications from a vehicle onboard computer system, the method comprising:
   establishing a communication link to an electronic device comprising at least one software application;
   receiving a listing of applicable commands for the electronic device, via the communication link, the listing of applicable commands comprising control commands for the at least one software application;
   constructing a menu comprising the listing of applicable commands;
   displaying the menu on a user interface of the vehicle onboard computer system;
   receiving a graphical user command via the menu of the user interface, the graphical user command comprising a user selection of at least one of the listing of applicable commands;
   converting the graphical user command into a voice instruction; and
   transmitting the voice instruction to the electronic device, using machine-to-machine (M2M) communication.

2. The method of claim 1, further comprising:
   activating a voice recognition (VR) capability of the electronic device, prior to transmitting the voice instruction.

3. The method of claim 1, further comprising:
   after transmitting the voice instruction to the electronic device,
   receiving data in response to the voice instruction; and
   performing an operation based on the received data.

4. The method of claim 1, further comprising:
   obtaining a plurality of graphical elements from the electronic device; and
   displaying the plurality of graphical elements on the user interface, the menu comprising the plurality of graphical elements, and the plurality of graphical elements representative of the listing of applicable commands;
   wherein the graphical user command is received via the plurality of graphical elements.

5. The method of claim 4, further comprising:
   receiving a plurality of selections via the plurality of graphical elements displayed on the user interface; and
   creating the graphical user command based on the plurality of selections.

6. The method of claim 1, wherein the graphical user command comprises an instruction to activate the at least one software application resident on the electronic device.

7. The method of claim 6, wherein the graphical user command comprises a second instruction to perform an operation using the activated at least one software application.

8. A system onboard a vehicle for performing machine to machine communication, the system comprising:
   an electronic device, configured to activate and operate a plurality of software applications, wherein the software applications reside on the electronic device; and
   an onboard computer system, communicatively coupled to the electronic device, the onboard computer system comprising:
     an application counterpart module, configured to:
       receive data associated with the plurality of software applications from the electronic device; and
       generate a graphical interface for user interaction with the plurality of software applications residing on the electronic device;
     a user interface, configured to:
       display the graphical interface; and
       receive, via the graphical interface, a user input instruction associated with control of at least one of the plurality of software applications resident on the electronic device;
     a command conversion module, configured to convert the received user input instruction into a speech command compatible with voice recognition technology; and
     a communication module, configured to transmit the speech command to the electronic device for execution by the electronic device.

9. The system of claim 8, wherein the electronic device is configured to:
   receive the transmitted speech command;
   interpret the speech command, utilizing a speech recognition algorithm;
   execute the interpreted speech command; and
   transmit data resulting from the executed speech command.

10. The system of claim 9, wherein the onboard computer system further comprises an application counterpart module, configured to:
    receive the transmitted data resulting from the executed speech command; and
    present output based on the transmitted data.

11. The system of claim 8, wherein the user interface is further configured to:
    obtain a plurality of graphical elements from the communicatively coupled electronic device;
    display the plurality of graphical elements; and
    receive the user input via the plurality of graphical elements.

12. The system of claim 8, wherein the user input instruction comprises a command to activate one of the plurality of applications resident on the electronic device.

13. The system of claim 12, wherein the user input comprises a second command to perform an operation using the activated one of the plurality of applications resident on the electronic device.

14. The system of claim 8, wherein the communication module is further configured to activate a speech-recognition capability of the electronic device, prior to transmitting the speech command.

15. A non-transitory, computer-readable medium for a vehicle onboard computer system containing instructions thereon, which, when executed by a processor, perform a method comprising:
    establishing a communication link between the vehicle onboard computer system and an electronic device comprising at least one software application;
    receiving, by the vehicle onboard computer system via the communication link, a plurality of control commands for the at least one software application;
    presenting, by a user interface of the vehicle onboard computer system, a plurality of graphical elements associated with the plurality of control commands;
    receiving a graphical user command via the plurality of graphical elements of the user interface, the graphical user command comprising a user selection of at least one of the plurality of control commands;
    translating the graphical user instruction into a form compatible with voice recognition (VR) technology, to obtain a VR instruction; and transmitting the VR instruction, via machine-to-machine (M2M) communication, to an VR-enabled electronic device, the electronic device comprising the VR-enabled electronic device.

16. The non-transitory, computer-readable medium of claim 15, wherein the method further comprises:
after transmitting the VR instruction,
receiving result data from the VR-enabled electronic device; and
presenting the result data.

17. The non-transitory, computer-readable medium of claim 15, wherein the method further comprises:
before translating the graphical user instruction,
receiving a plurality of graphical elements from the VR-enabled electronic device;
presenting the plurality of graphical elements to a user, via a user interface; and
receiving the graphical user instruction via the plurality of graphical elements.

18. The non-transitory, computer-readable medium of claim 17, wherein the method further comprises:
presenting menu options to the user;
receiving a plurality of selections of the menu options via the plurality of graphical elements; and
creating the VR instruction based on the plurality of selections.

19. The non-transitory, computer-readable medium of claim 15, wherein the user instruction comprises:
a first command to execute a software application on the VR-enabled electronic device, the at least one software application comprising the software application; and
a second command to perform a particular operation using the executed software application.

* * * * *